(12) United States Patent
Solomon (10) Patent No.: US 9,478,957 B1
(45) Date of Patent: *Oct. 25, 2016

(54) ELECTRICAL BOX LOCATION INDICATOR SYSTEM

(71) Applicant: Richard K. Solomon, Silverthorne, CO (US)

(72) Inventor: Richard K. Solomon, Silverthorne, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/843,669

(22) Filed: Sep. 2, 2015

Related U.S. Application Data (63) Continuation-in-part of application No. 13/954,603, filed on Jul. 30, 2013, now Pat. No. 9,148,004.

(60) Provisional application No. 61/677,255, filed on Jul. 30, 2012.

(51) Int. Cl.
| | |
|---|---|
| *E04F 19/00* | (2006.01) |
| *E04H 14/00* | (2006.01) |
| *H02G 3/10* | (2006.01) |
| *F16M 13/02* | (2006.01) |

(52) U.S. Cl.
CPC ................. *H02G 3/10* (2013.01); *E04F 19/00* (2013.01); *F16M 13/02* (2013.01)

(58) Field of Classification Search
CPC .......... H02G 3/10; H02G 3/08; H02G 3/086; H02G 3/12; H02G 3/121; H02G 3/123; H02G 3/126; E04F 19/00; F16M 13/02; B25H 7/00; B25H 7/02; B25H 7/045; H05K 5/0004

See application file for complete search history.

(56) References Cited

U.S. PATENT DOCUMENTS

| | | | | | |
|---|---|---|---|---|---|
| 2,666,546 | A | * | 1/1954 | Reilly | H02G 3/12 220/3.4 |
| 2,775,812 | A | * | 1/1957 | Mohr | E04C 2/521 220/3.4 |
| 2,898,688 | A | * | 8/1959 | Cottar | B25H 7/04 220/3.4 |
| 3,636,236 | A | | 1/1972 | Smith | |
| 3,888,013 | A | * | 6/1975 | Benoit | B25H 7/04 220/3.4 |
| 4,059,905 | A | * | 11/1977 | Wieting | G01B 5/14 33/528 |
| 4,202,457 | A | | 5/1980 | Tansi | |
| 4,209,103 | A | * | 6/1980 | Glovier | H02G 3/12 220/3.4 |
| 4,339,973 | A | * | 7/1982 | Lawrence | B25H 7/02 30/161 |
| 4,605,139 | A | * | 8/1986 | Dacar | H02G 3/12 174/57 |

(Continued)

*Primary Examiner* — Joshua J Michener
*Assistant Examiner* — Keith Minter (57) ABSTRACT

An electrical box location indicator system for use when installing a wall panel over a mounted electrical box. An electrical box is fixedly attached to a structural wall member such that a portion of a box sidewall is directly touching a member side face orthogonal to a member front face. A first tab and a second tab project outwardly and away from a box front lip such that both tabs are coplanar with the box sidewall and orthogonal to the member front face. The first tab and the second tab push against a rear panel surface of the wall panel to create a bow in the wall panel that indicates the location of the electrical box. The first tab and the second tab are snapped or cut off after processing of the wall panel is completed.

9 Claims, 8 Drawing Sheets

(56) References Cited

U.S. PATENT DOCUMENTS

| | | | | |
|---|---|---|---|---|
| 4,626,617 | A * | 12/1986 | Rye | H02G 3/126 174/53 |
| 4,850,115 | A | 7/1989 | Price et al. | |
| 4,907,711 | A * | 3/1990 | Stuchlik, III | H02G 3/14 220/3.4 |
| 4,922,056 | A | 5/1990 | Larsson | |
| 4,951,395 | A | 8/1990 | Lameiro | |
| 5,040,304 | A * | 8/1991 | Jackson | H02G 3/12 33/528 |
| 5,129,297 | A * | 7/1992 | Bussi | H02G 1/00 30/366 |
| 5,157,844 | A * | 10/1992 | Mallison | E04C 2/52 33/528 |
| 5,172,483 | A * | 12/1992 | Yocono, Sr. | H02G 1/00 33/528 |
| 5,177,325 | A | 1/1993 | Giammanco | |
| 5,316,165 | A | 5/1994 | Moran, Jr. | |
| 5,350,884 | A | 9/1994 | Littrell | |
| 5,480,053 | A * | 1/1996 | Jorgensen | H02G 3/081 220/3.9 |
| 5,588,549 | A | 12/1996 | Furtner | |
| 5,594,207 | A | 1/1997 | Fabian et al. | |
| 5,596,174 | A | 1/1997 | Sapienza | |
| 5,630,281 | A * | 5/1997 | Pledger | H02G 1/00 269/904 |
| 5,639,991 | A * | 6/1997 | Schuette | H02G 3/12 174/58 |
| 5,659,151 | A | 8/1997 | Dale | |
| 5,710,392 | A | 1/1998 | Bordwell et al. | |
| 5,744,753 | A | 4/1998 | Nattel | |
| 5,841,068 | A | 11/1998 | Umstead et al. | |
| 5,981,874 | A | 11/1999 | Reiker | |
| 6,055,736 | A * | 5/2000 | Gaston | B25H 7/04 33/528 |
| 6,101,731 | A * | 8/2000 | Mesa | H02G 3/12 33/528 |
| 6,103,974 | A * | 8/2000 | Erdfarb | B05B 15/045 174/66 |
| 6,229,087 | B1 | 5/2001 | Archer | |
| 6,283,690 | B1 * | 9/2001 | Belter | F16B 15/02 174/50 |
| 6,300,567 | B1 | 10/2001 | Hayduke et al. | |
| 6,303,862 | B1 | 10/2001 | Reiker | |
| 6,307,154 | B1 | 10/2001 | Gretz | |
| 6,317,995 | B1 * | 11/2001 | Hoffmann, Sr. | E04F 21/00 33/528 |
| 6,369,323 | B1 | 4/2002 | Wright | |
| 6,395,979 | B1 | 5/2002 | English | |
| 6,403,883 | B1 | 6/2002 | Morgan et al. | |
| 6,463,668 | B1 * | 10/2002 | Williams | B25H 7/04 33/528 |
| 6,511,269 | B1 * | 1/2003 | Smasne | H02G 3/12 144/371 |
| 6,686,540 | B2 * | 2/2004 | Compagnone, Jr. | H02G 3/126 174/58 |
| 6,810,598 | B2 | 11/2004 | Boys | |
| 6,867,369 | B2 * | 3/2005 | Wiggins | H02G 3/12 174/58 |
| 6,940,016 | B1 | 9/2005 | Cornett et al. | |
| 7,009,110 | B1 | 3/2006 | Gretz | |
| D538,752 | S | 3/2007 | Kiely | |
| 7,189,928 | B2 * | 3/2007 | Denier | H02G 3/123 174/480 |
| 7,210,241 | B1 | 5/2007 | Bree | |
| 7,381,892 | B2 * | 6/2008 | Dinh | H02G 3/126 174/481 |
| 7,454,844 | B1 | 11/2008 | Ruby | |
| D598,392 | S | 8/2009 | Vigorito et al. | |
| 7,572,978 | B1 * | 8/2009 | Keith, Jr. | H02G 3/126 174/58 |
| 7,845,089 | B1 * | 12/2010 | Lavalle | H02G 1/00 33/528 |
| D635,099 | S | 3/2011 | Kramer | |
| 7,935,887 | B2 | 5/2011 | Petak | |
| 7,989,699 | B1 | 8/2011 | Shotey et al. | |
| 8,561,312 | B2 * | 10/2013 | Dressel | H02G 3/00 33/528 |
| D692,836 | S | 11/2013 | Thomas et al. | |
| 8,579,135 | B1 * | 11/2013 | Shotey | H02G 3/123 220/3.6 |
| D700,893 | S | 3/2014 | Thomas et al. | |
| D713,797 | S | 9/2014 | Solomon | |
| 9,148,004 | B1 * | 9/2015 | Solomon | H02G 3/12 |
| 2003/0177711 | A1 * | 9/2003 | Gatherum | E04F 19/02 52/58 |
| 2003/0213801 | A1 | 11/2003 | Bradley et al. | |
| 2006/0285278 | A1 | 12/2006 | Tankersley | |
| 2008/0093099 | A1 * | 4/2008 | Webb | H02G 3/14 174/53 |
| 2009/0025953 | A1 * | 1/2009 | Troder | H02G 3/10 174/61 |
| 2009/0194311 | A1 * | 8/2009 | Merrill | H01R 9/2408 174/60 |
| 2011/0239477 | A1 * | 10/2011 | Dressel | H02G 3/00 33/528 |
| 2012/0067610 | A1 * | 3/2012 | Stonebraker | H02G 3/081 174/50 |
| 2014/0083759 | A1 * | 3/2014 | Gagne | H02G 3/086 174/480 |
| 2014/0202758 | A1 * | 7/2014 | Lolachi | H02G 3/123 174/481 |
| 2015/0001361 | A1 * | 1/2015 | Gagne | H02G 3/086 248/231.91 |

\* cited by examiner

ELECTRICAL BOX LOCATION INDICATOR SYSTEM

CROSS REFERENCE

This application claims priority to U.S. patent application Ser. No. 13/954,603, filed Jul. 30, 2013, which is a non-provisional of U.S. Provisional Application No. 61/677,255, filed Jul. 30, 2012, the specification(s) of which is/are incorporated herein in their entirety by reference.

FIELD OF THE INVENTION

The present invention relates to electrical boxes, in particular, an electrical box having a locator that indicates the position of the electrical box from a wall panel.

BACKGROUND OF THE INVENTION

Electrical boxes are used as a container for electrical connections in an electrical system. For instance, a small metal or plastic junction box may be used to mount electrical switches or electrical outlets in or on a building. When installing electrical boxes and drywall, the electrical box is mounted and then the drywall is mounted afterwards. A cutting tool may be used to cut a hole in the drywall to allow the electrical box to protrude through the hole for use. However, the location of the electrical box may not be marked, thereby making it difficult to locate the electrical box for cutting the hole when covered by the drywall.

One practice is to cut the hole prior to mounting the drywall. However, the position of the hole may not align with the location of the electrical box, which would require enlarging the hole or using a new sheet of drywall. Hence, there is a need for system that can accurately indicate the location of the electrical box. The present invention features an electrical box location indicator system for use when installing drywall.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

An electrical box location indicator system for use when installing a wall panel over a mounted electrical box is described herein. According to an embodiment of the present invention, the system may comprise a structural wall member disposed in a structural wall frame, and an electrical box mounted to the wall member. The wall member may have a member front face disposed on a Plane A and a member side face orthogonal to Plane A.

An exemplary embodiment of the electrical box may comprise a box sidewall, a box rear side, an opposing open box front side having a box front lip, a first tab removably attached to the box front lip, and a second tab removably attached to the box front lip. Preferably, the electrical box is fixedly attached to the member side face such that a portion of the box sidewall is directly touching the member side face, and the box front lip projects out and away from the member front face. The first tab may project outwardly and away from the box front lip such that the first tab is coplanar with the box sidewall and orthogonal to the member front face. A first scored line of the first tab may be disposed at an interface of the box front lip and a first tab rear edge to allow for easy removal of the first tab. The second tab may project outwardly and away from the box front lip such that the second tab is coplanar with the box sidewall and orthogonal to the member front face. A second scored line of the second tab may be disposed at an interface of the box front lip and a second tab rear edge to allow for easy removal of the second tab.

The first tab and the second tab may push against the rear panel surface of the wall panel to create a bow in the wall panel that indicates the location of the electrical box from behind the wall panel. A panel aperture is cut through the wall panel to fit around the electrical box, which eliminates the bow in the wall panel. When installation of the wall panel is complete, the first tab and the second tab may be snapped or cut off at the first scored line and the second scored line respectively.

DESCRIPTION OF PREFERRED EMBODIMENTS

Following is a list of elements corresponding to a particular element referred to herein:
   100 electrical box location indicator system
   200 structural wall frame
   210 structural wall member
   212 member front face
   214 member side face
   220 wall panel
   222 front panel surface
   224 rear panel surface
   226 panel aperture
   300 electrical box
   310 box sidewall
   350 box rear side
   360 open box front side
   362 box front lip
   370 box projection distance
   400 first tab
   402 first tab rear edge
   404 first scored line
   450 second tab
   452 second tab rear edge 454 second scored line
500 Plane A Referring now to FIG. 1-8, the present invention features an electrical box location indicator system (100) for use when installing a wall panel (220) over a mounted electrical box (300). In one exemplary embodiment, the system (100) may comprise a structural wall member (210) disposed in a structural wall frame (200), and an electrical box (300) disposed on the wall member (210). The wall member (210) may have a member front face (212) disposed on a Plane A (500) and a member side face (214) orthogonal to Plane A (500).

In some embodiments, the electrical box (300) may comprise a box sidewall (310), a box rear side (350), an opposing open box front side (360) having a box front lip (362), a first tab (400) removably attached to the box front lip (362), and a second tab (450) removably attached to the box front lip (362). Preferably, the electrical box (300) is fixedly attached to the member side face (214). For instance, the electrical box (300) is fixedly attached to the member side face (214) such that a portion of the box sidewall (310) is touching, or interfacing with, the member side face (214), and the box front lip (362) projects out and away from the member front face (212) by a box projection distance (370).

In some embodiments, the first tab (400) may project outwardly and away from the box front lip (362) such that the first tab (400) is coplanar with the box sidewall (310) and orthogonal to the member front face (212). Specifically, the member front face (212) lies on Plane A whereas the first tab (400) is perpendicular to Plane A. In other embodiments, the first tab (400) may have a first tab rear edge (402) disposed contiguously on the box front lip (362). A first scored line (404) of the first tab (400) may be disposed at an interface of the box front lip (362) and the first tab rear edge (402) to allow for the first tab (400) to be removed. Alternatively, a perforated line may be disposed between the first tab rear edge (402) and the box front lip (362).

In some embodiments, the second tab (450) may project outwardly and away from the box front lip (362) such that the second tab (450) is coplanar with the box sidewall (310) and orthogonal to the member front face (212). Specifically, the member front face (212) lies on Plane A whereas the second tab (450) is perpendicular to Plane A. Preferably, the second tab (450) is disposed on the box front lip (362) such that it is opposite to the first tab (400). In other embodiments, the second tab (450) may have a second tab rear edge (452) disposed contiguously on the box front lip (362). A second scored line (454) of the second tab (450) may be disposed at an interface of the box front lip (362) and the second tab rear edge (452) to allow for the second tab (450) to be removed. In alternate embodiments, a perforated line may be disposed between the second tab rear edge (452) and the box front lip (362).

When installing the wall panel (220), the wall panel (220) may be fastened to the structural wall frame (200) such that a rear panel surface (224) of the wall panel (220) faces the member front face (212). The first tab (400) and the second tab (450) may push against the rear panel surface (224) to create a bow in the wall panel (220) that indicates a location of the electrical box (300) on the wall panel (220). Specifically, a tab front edge of each of the first tab (400) and the second tab (450) is touching the rear panel surface (224). A cutting device, such as a jig saw or a reciprocating saw, may be used to cut the wall panel (220) at the vicinity of the bow such that the cut is around the projecting electrical box (300). A panel aperture (226) is created to fit around the electrical box (300), which eliminates the bow in the wall panel (220) such that the box front lip (362) is disposed flushed with a front panel surface (222) of the wall panel (220). Preferably, the panel aperture is sized and shaped in order to fit the box front lip (362) through the wall panel (220).

Preferably, a thickness (228) of the wall panel (220) is equal to the box projection distance (370) to make the box front lip (362) flushed with the front panel surface (222). For example, the box projection distance (370) and the thickness (228) of the wall panel (220) may each be about ½ to 1 inch. After the installation is completed, the first tab (400) and the second tab (400) may be snapped or cut off at the first scored line (404) and the second scored line (454) respectively.

In an alternative embodiment, when texturing or painting the wall panel (220), the electrical box (300) may be covered to prevent contamination. For instance, masking tape may be placed over the electrical box (300) by attaching the masking tape to the box front lip (362) such that the first tab (400) and the second tab (450) protrude through the masking tape. After the masking tape is removed upon completion of texturing or painting the wall panel (220), the first tab (400) and the second tab (450) may be snapped or cut off at the first scored line (404) and the second scored line (454) respectively.

In some embodiment, the first tab (400) or the second tab (450) may have a width of about ⅝ to 1 inch from a tab first side edge to a tab second side edge. The first tab (400) or the second tab (450) may have a depth of about ¼ to 1 inch from a tab front edge to the tab rear edge. In other embodiment, the tab front edge (410) may be straight, curved, or tapered to a point. For instance, the first tab (400) or the second tab (450) is in a shape of an arrow tip, a rectangle or a semi-circle.

In other embodiments, the structural wall member (210) may be a structural stud, a blocking board, or a joist. For example, the structural stud may be a linear stud that is longitudinal located on Plane A and parallel to a plumb line. As known to one of ordinary skill in the art, a plump line is a vertical line of an upright surface. As another example, the blocking board may be a horizontally disposed board for spacing and providing support to the structural stud. In another embodiment, the joist may be a horizontally disposed board such as ceiling joist or a floor joist.

In some embodiments, the electrical box (300) may be in a shape of a circular box, a rectangular box, or a polygonal box. Non-limiting examples of the electrical box (300) may include a fan fixture box, a ceiling box, a wall box, a floor box, a light fixture box, an outlet box, or a low-voltage box.

As used herein, the structural wall frame (200) may be framing for a wall, a ceiling, or a floor. In further embodiments, the wall panel (220) may be drywall sheet, a sheet rock, a metal sheet, a plywood, an oriented strand board (OSB), or a cementitious board. It is understood that wall panel (220) is not limited to the aforementioned examples.

Figure 1:
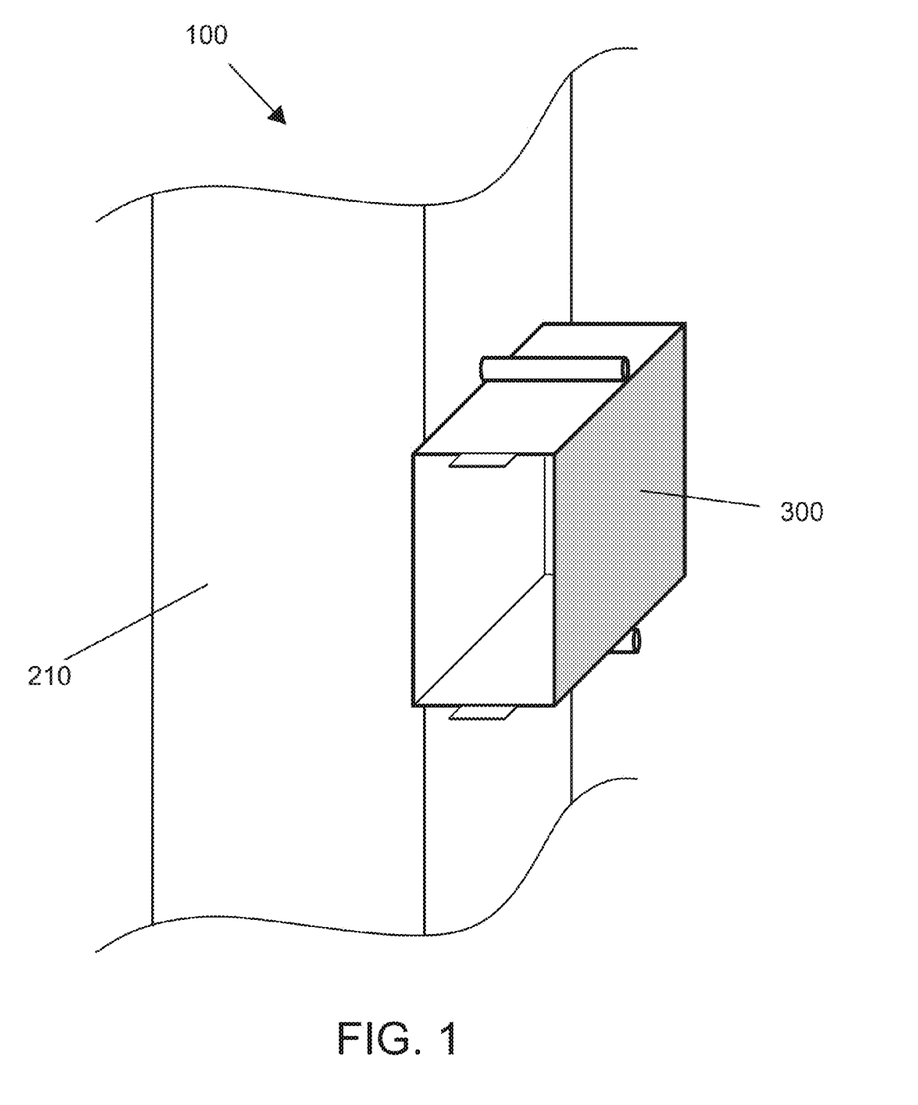
FIG. 1 shows a perspective view of the present invention.
Figure 2:
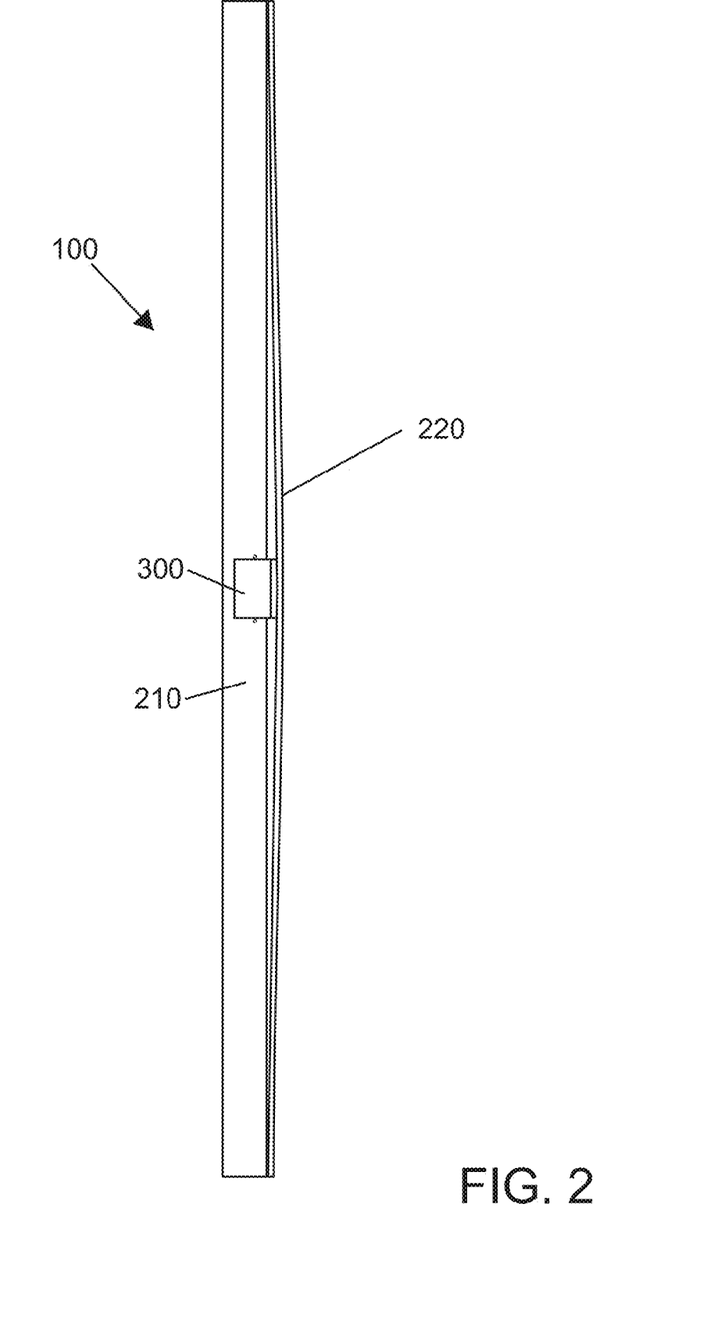
FIG. 2 shows an electrical box mounted to a structural wall member with tabs pushing against a wall panel to form a bow shape.
Figure 3:
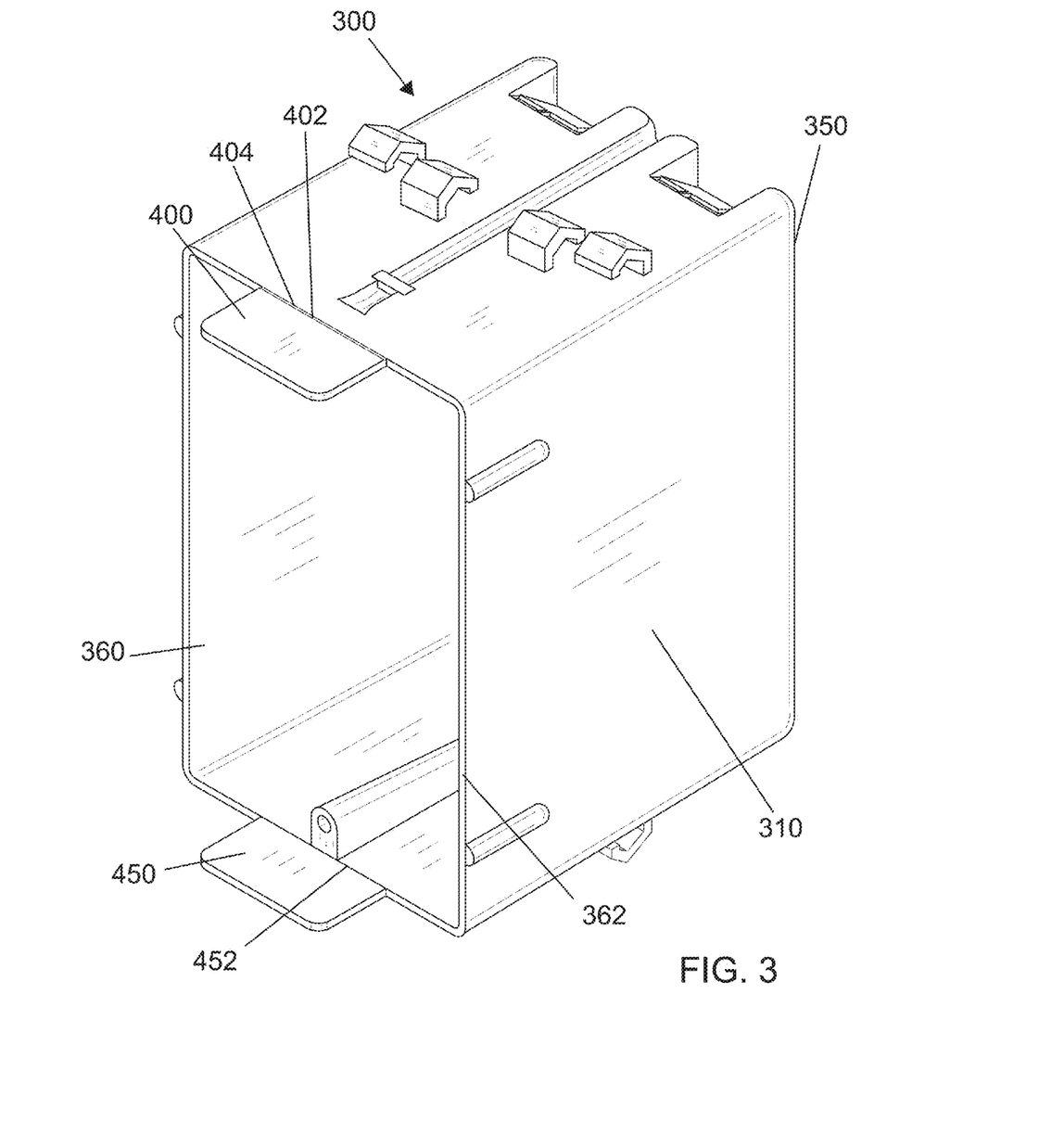
FIG. 3 shows a non-limiting example of an electrical box according to an embodiment of the present invention.
Figure 4:
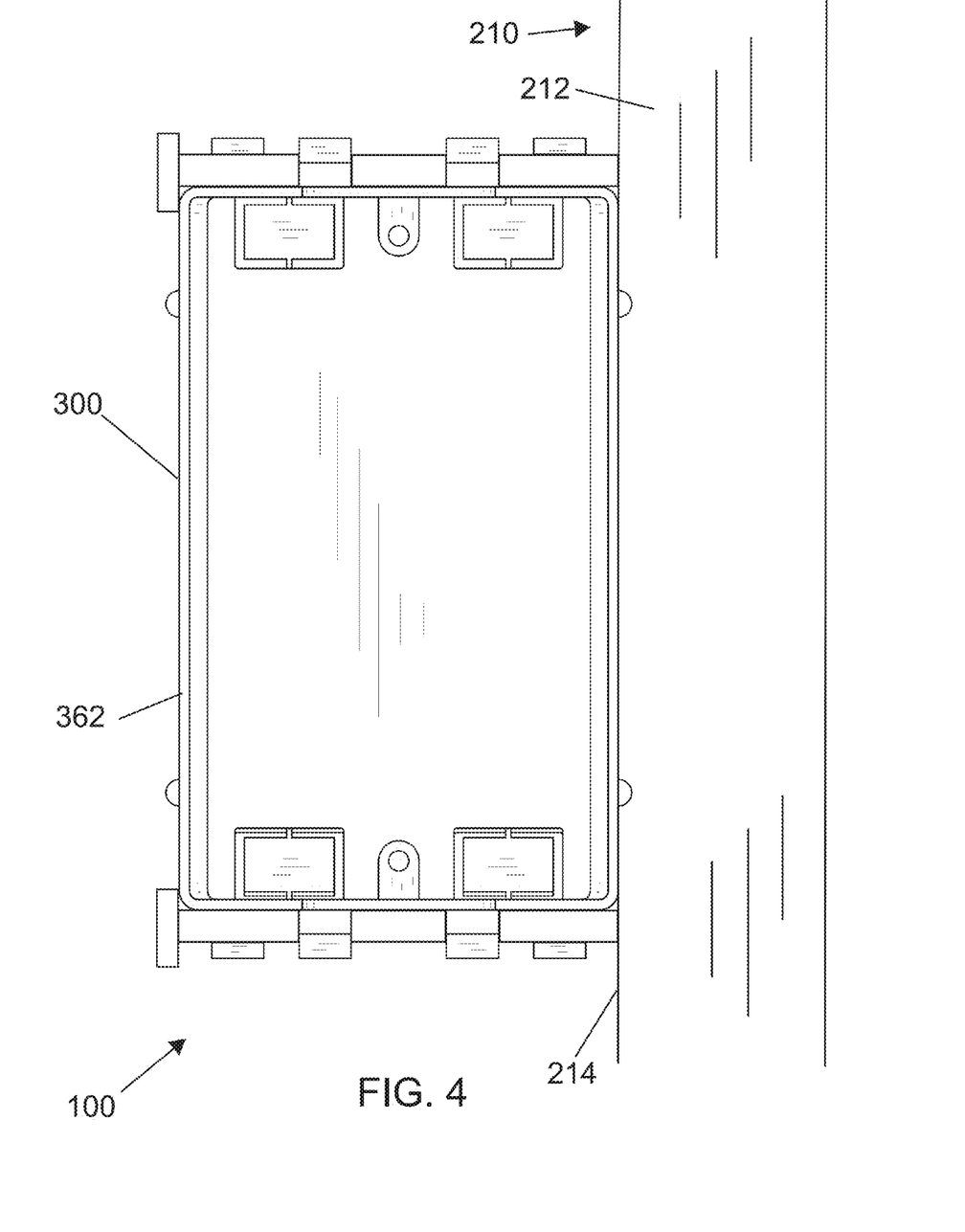
FIG. 4 is a front view of the electrical box mounted to the wall member.
Figure 5:
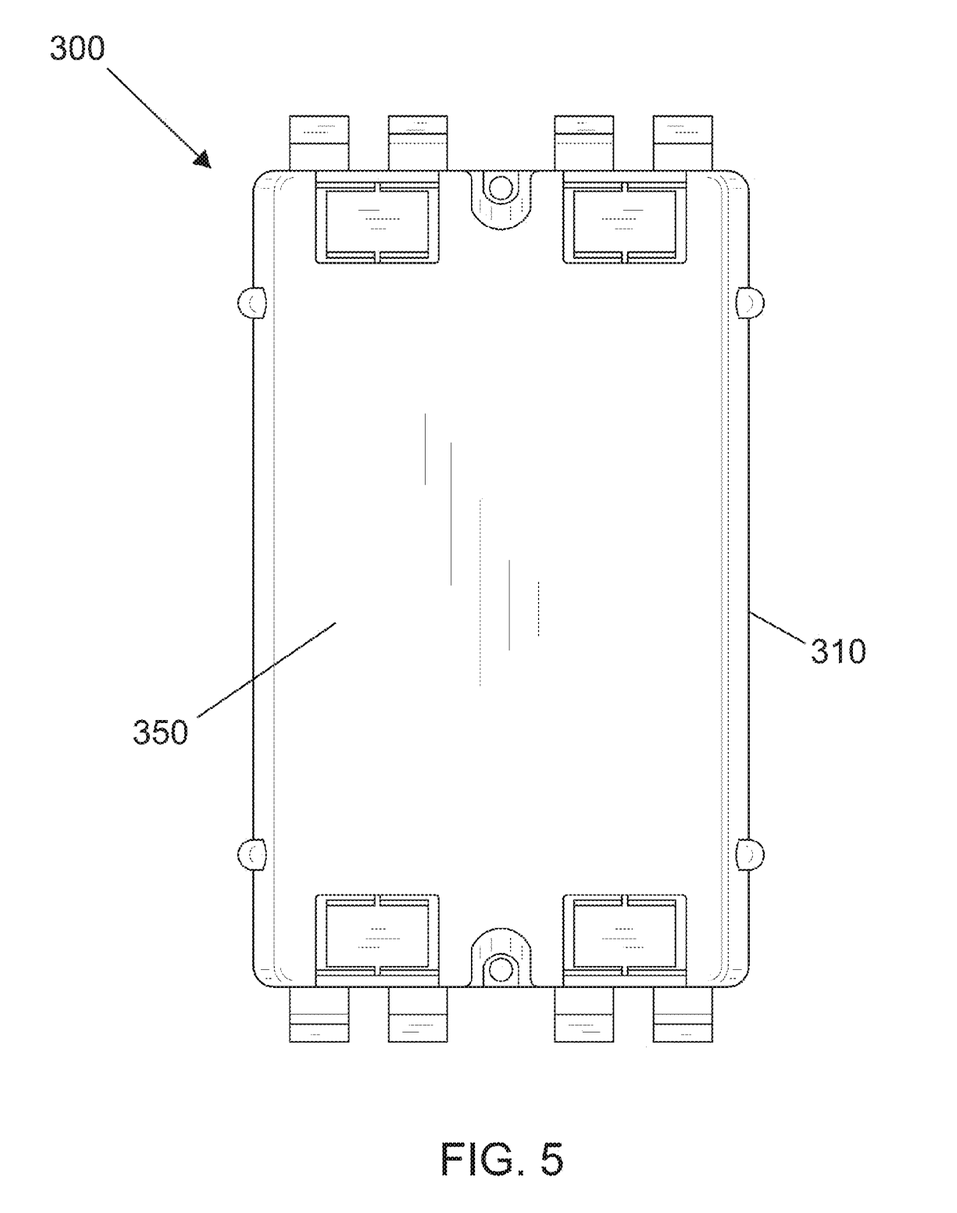
FIG. 5 shows a rear view of the electrical box according to an embodiment of the present invention.
Figure 6:
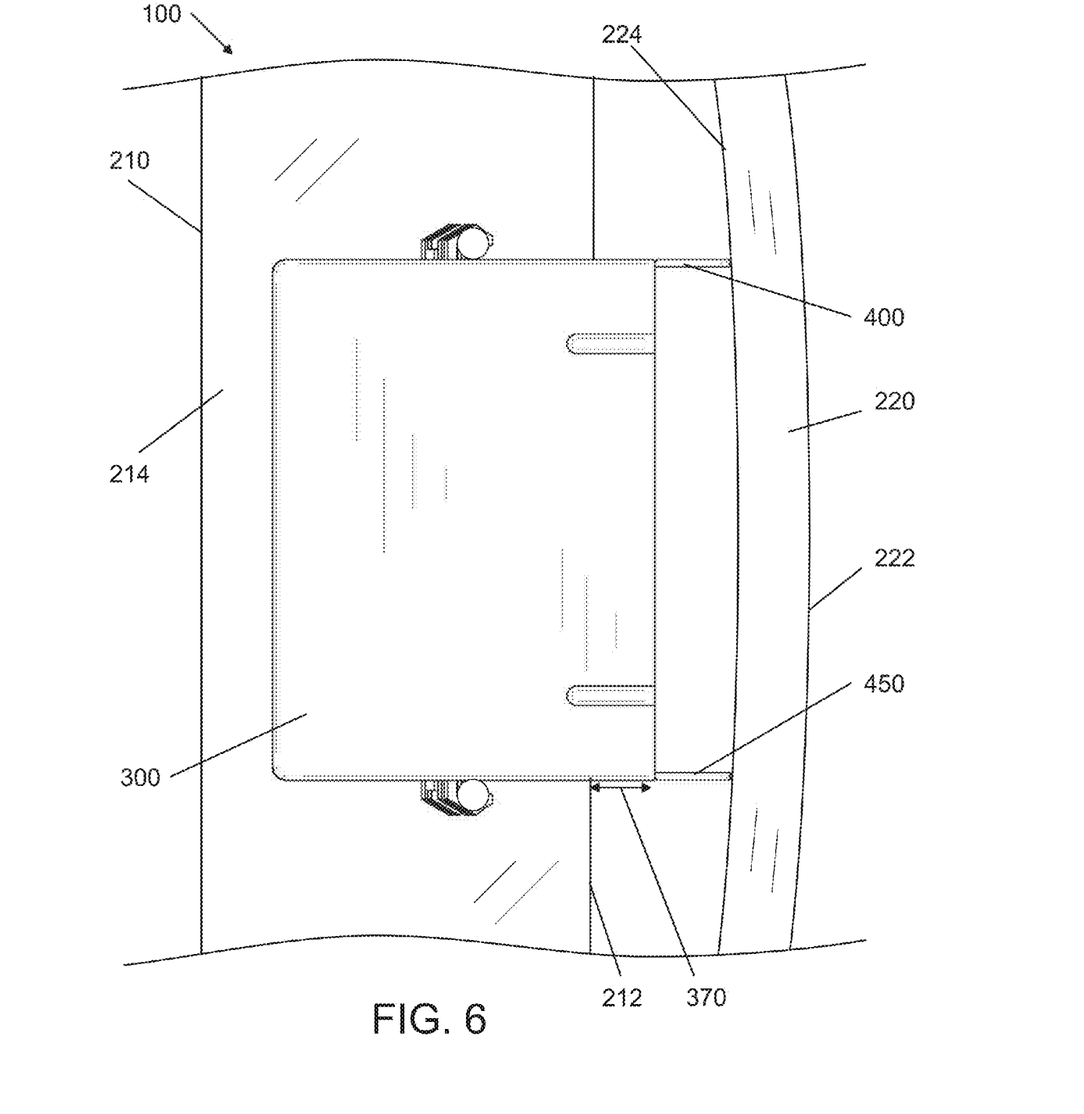
FIG. 6 is a close-up side view of the electrical box mounted to the wall member with tabs disposed through the wall panel to make the wall panel flushed with the wall member.
Figure 7:
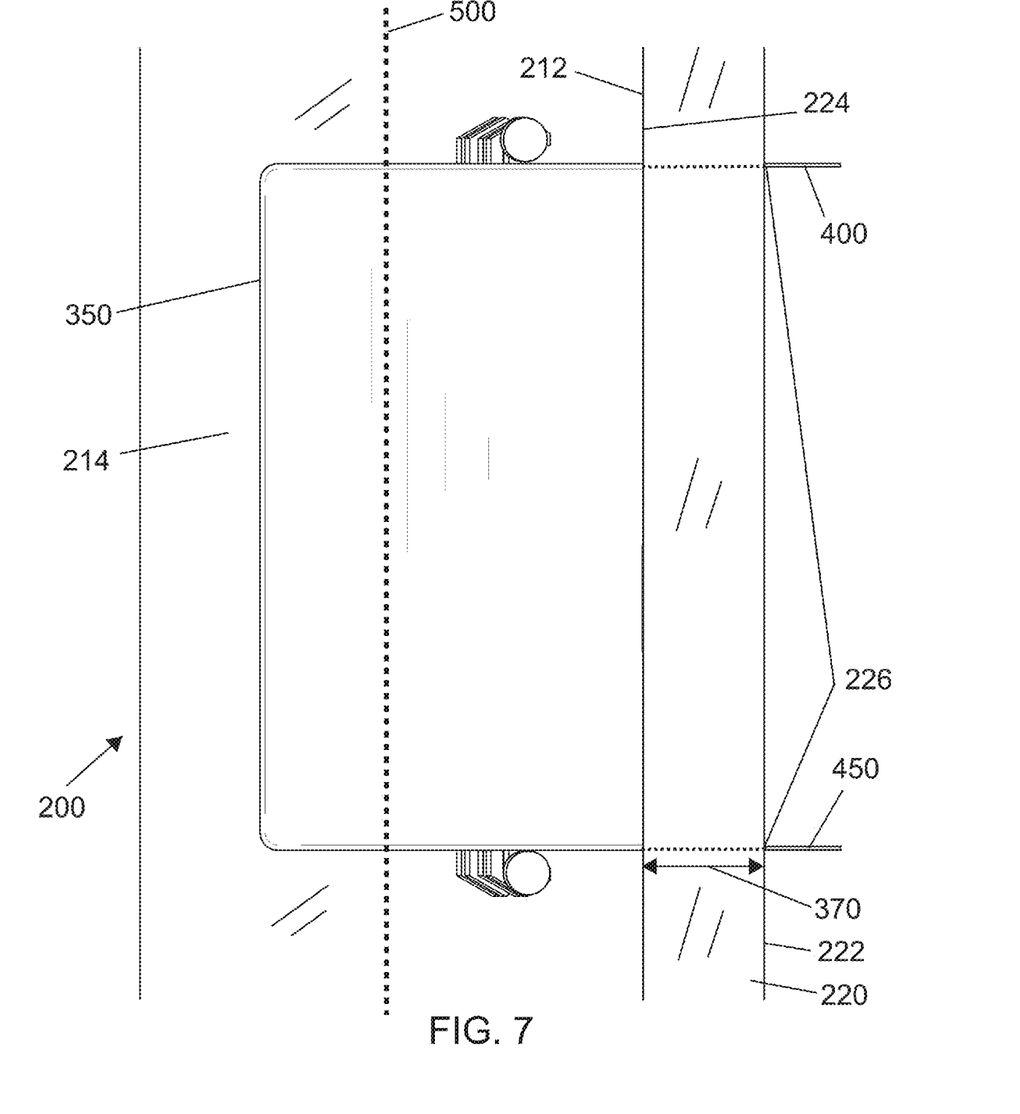
FIG. 7 is a close-up side view of the electrical box mounted to the wall member with tabs pushing against the wall panel to make a bow shape.
Figure 8:
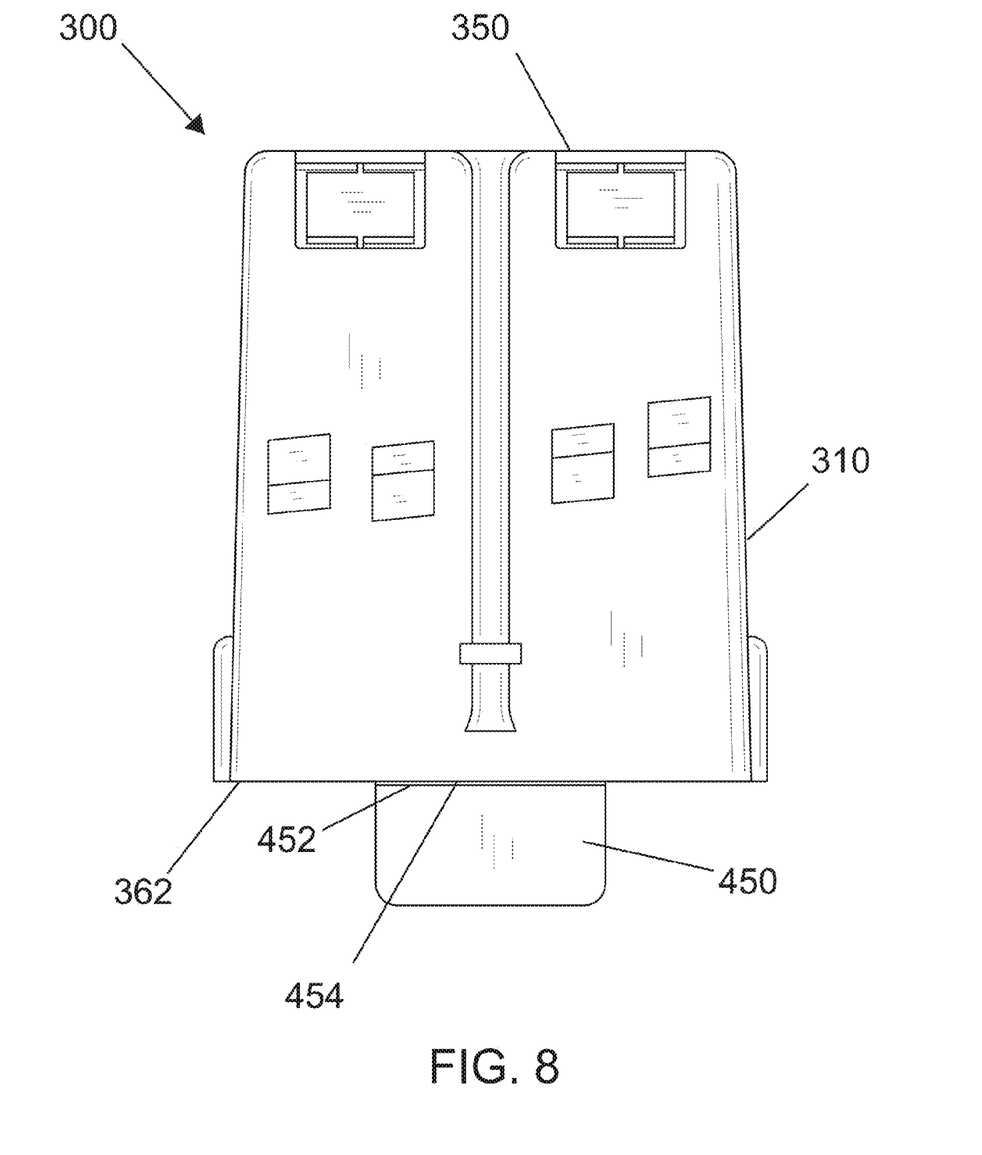
FIG. 8 shows a bottom view of the electrical box according to an embodiment of the present invention.

As shown in FIGS. 6-7, in some embodiments, a method for installing the wall panel over the electrical box mounted to the structural wall member of the structural wall frame is described herein. First, the electrical box is mounted to the wall member such that box sidewall is pressed against the member side face, and the open box front side is oriented is a same orientation as the member front face. For example, the electrical box may be attached to the wall member via nails, screws, braces, or straps. The wall panel is then attached to the structural wall frame such that the rear panel surface faces the member front face. The first tab and second tab are disposed and pushes against the rear drywall surface to create a bow in the wall panel. A panel aperture is made by cutting around the projecting electrical box such that the panel aperture fits around the electrical box to eliminate the bow in the wall panel. The first tab and second tab are snapped or cut off at the first scored line and the second scored line respectively.

In alternative embodiments, a method for masking the electrical box for texturing or painting the wall panel may be performed prior to removing the first tab and second tab. A masking tape may be place over the electrical box and attached to the box front lip. The open front side of the electrical box may be completely covered or at least partially covered. The first tab and the second tab may protrude through the masking tape. The masking tape is then removed upon completion of texturing or painting the wall panel, and the first tab and second tab are snapped or cut off at the first scored line and the second scored line respectively.

As used herein, the term "about" refers to plus or minus 10% of the referenced number.

The disclosures of the following U.S. patents are incorporated in their entirety by reference herein: U.S. Pat. No. 2,898,688, U.S. Pat. No. 3,888,013, U.S. Pat. No. 7,210,241, U.S. Pat. No. 7,454,844, U.S. Pat. No. 7,935,887, U.S. Pat. No. 7,989,699, and U.S. Pub. No. 2011/0239477.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. An electrical box location indicator system (100) for use when installing a wall panel (220) over a mounted electrical box (300), wherein said system (100) comprises:
   a. a structural wall member (210) disposed in a structural wall frame (200), where the wall member (210) has a member front face (212) disposed on a Plane A (500) and a member side face (214) orthogonal to Plane A (500); and
   b. the electrical box (300) fixedly attached to the member side face (214), wherein the electrical box (300) comprises:
      i. a box sidewall (310);
      ii. a box rear side (350);
      iii. an opposing open box front side (360) having a box front lip (362), wherein the electrical box (300) is fixedly attached to the member side face (214) such that a portion of the box sidewall (310) is touching the member side face (214) and the box front lip (362) projects out and away from the member front face (212) by a box projection distance (370); wherein the box projection distance (370) is equal to a thickness (228) of the wall panel (220);
      iv. a first tab (400) removably attached to the box front lip (362), wherein the first tab (400) projects outwardly and away from the box front lip (362) such that the first tab (400) is coplanar with the box sidewall (310) and orthogonal to the member front face (212), wherein the first tab (400) is flat and blunt, wherein the first tab (400) comprises non cutting round edges, wherein the first tab (400) comprises a first tab rear edge (402) disposed contiguously on the box front lip (362), wherein the first tab (400) comprises a first scored line (404) disposed at an interface of the box front lip (362) and the first tab rear edge (402), wherein the first scored line (404) allows for the first tab to be removed after installing the wall panel (220) over the mounted electrical box (300); and
      v. a second tab (450) removably attached to the box front lip (362) and opposite of the first tab (400), wherein the second tab (450) projects outwardly and away from the box front lip (362) such that the second tab (450) is coplanar with the box sidewall (310) and orthogonal to the member front face (212), wherein the second tab (450) is flat and blunt, wherein the second tab (450) comprises non cutting round edges, wherein the second tab (450) comprises a second tab rear edge (452) disposed contiguously on the box front lip (362), wherein the second tab (450) comprises a second scored line (454) disposed at an interface of the box front lip (362) and the second tab rear edge (452), wherein the second scored line (454) allows for the second tab to be removed after installing the wall panel (220) over the mounted electrical box (300);
   wherein upon installation, the wall panel (220) is fastened to the structural wall frame (200) such that a rear panel surface (224) of the wall panel (220) faces the member front face (212), wherein the first tab (400) and the second tab (450) pushes against the rear panel surface (224), thereby creating a bow in the wall panel (220) to indicate a location of the electrical box (300) on the wall panel (220), wherein the electrical box location indicator system (100) further includes a cutting device used to cut around the projecting electrical box (300) to create a panel aperture (226), wherein after installation the panel aperture (226) is formed in the wall panel (220), wherein the panel aperture (226) fits around the electrical box (300) to eliminate the bow in the wall panel (220) such that the box front lip (362) is disposed flushed with a front panel surface (222) of the wall panel (220), wherein the first tab (400) and the second tab (400) are snapped or cut off at the first scored line (404) and the second scored line (454) respectively.

2. The system (100) of claim 1, wherein the first tab (400) or the second tab (450) has a width of about ½ to 1 inch from a tab first side edge to a tab second side edge, wherein the first tab (400) or the second tab (450) has a depth of about ¼ to 1 inch from a tab front edge to the tab rear edge.

3. The system (100) of claim 2, wherein the tab front edge (410) is tapered to a point or curved.

4. The system (100) of claim 1, wherein the first tab (400) or the second tab (450) is in a shape of an arrow tip.

5. The system (100) of claim 1, wherein the electrical box (300) is in a shape of a circular box, a rectangular box, or a polygonal box.

6. The system (100) of claim 1, wherein the electrical box (300) is a fan fixture box, a ceiling box, a wall box, a floor box, a light fixture box, an outlet box, or a low-voltage box.

7. The system (100) of claim 1, wherein the structural wall member (210) is a structural stud, a blocking board, or a joist.

8. The system (100) of claim 1, wherein a thickness (228) of the wall panel (220) is equal to the box projection distance (370).

9. The system (100) of claim 8, wherein the box projection distance (370) and the thickness (228) of the wall panel (220) is about ½ to 1 inch.

* * * * *